Patented Oct. 26, 1926.

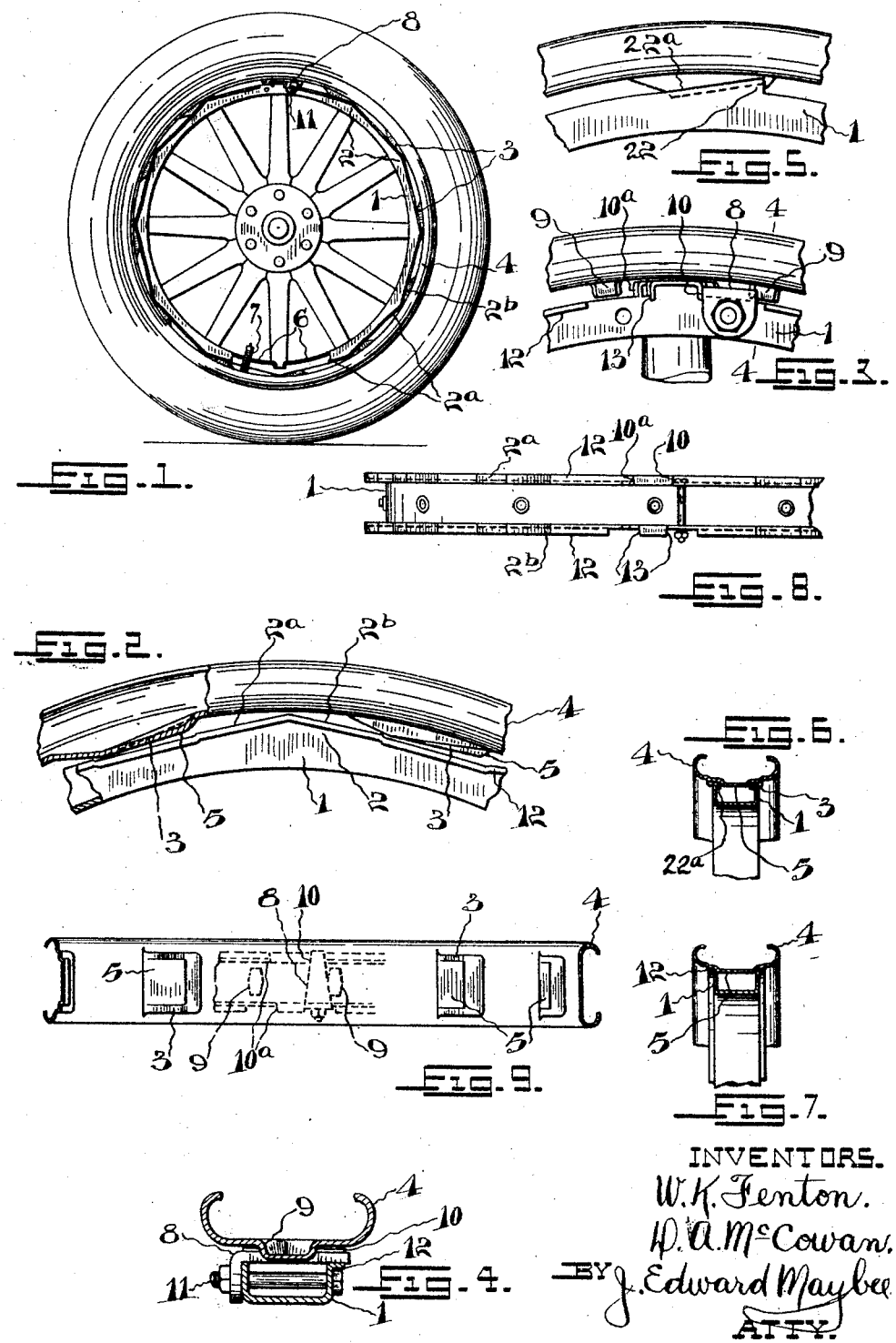

1,604,155

UNITED STATES PATENT OFFICE.

WILSON K. FENTON AND DAVID A. McCOWAN, OF TORONTO, ONTARIO, CANADA.

DEMOUNTABLE RIM FOR WHEELS.

Application filed August 22, 1924. Serial No. 733,590.

This invention relates to what are known as demountable rims such as commonly used on motor vehicles and which carry the pneumatic tires.

In removing a rim of this type such as now in use, it is necessary to remove a number of nuts, usually six, and remove six retainers and thereafter to replace them when a rim is replaced.

Our object is to devise a construction which will reduce the parts to be operated, or removed and replaced, to a minimum and to effect this result with little or no addition to the cost of the wheel and rim.

We attain our object by means of the constructions hereinafter described and illustrated in the accompanying drawings in which—

Fig. 1 is a side elevation of a complete wheel showing our improvements thereon;

Fig. 2 a detail view, on a larger scale, showing the relative position of the wedges to the inclined faces when the rim is placed on the wheel;

Fig. 3 a detail in side elevation showing the means for locking the rim on the wheel;

Fig. 4 a cross section on the lines 4—4 in Fig. 3;

Fig. 5 a detail showing a modification of the inclined faces shown in Fig. 2;

Fig. 6 a cross section, on a reduced scale, of the parts shown in Fig. 5;

Fig. 7 a cross section of the preferred construction on the same scale as Fig. 6;

Fig. 8 a plan view of the wheel felloe, partly broken away; and

Fig. 9 a cross section of the tire rim.

In the drawings like numerals of reference indicate corresponding parts in the different figures.

1 is the felloe of a wheel which is provided with an ordinary hub and spokes. The felloe is formed of channel shaped sheet metal and is provided with slots 6 adapted for the passage of a pneumatic tire valve stem 7, one or the other of the slots being used according to whether a tire carrying rim 4 is used on the right or left hand side of the vehicle. The opposite walls of the channel are provided with a plurality of integral projections 2 having oppositely inclined faces $2^a$, $2^b$. These faces are formed by stamping out the metal from which the felloe is made to form lateral extensions of the projections at the edges of the opposite walls after the felloe blank is rolled into shape. The two sets of faces are employed to enable the same rim to be used at either side of the vehicle. In Figs. 1, 2, 3, 7 and 8 the extensions extend outwardly and are continuous with the lips 12 extending outward from the felloe between the extensions. In Figs. 5 and 6 the extensions $22^a$ extend inwardly of the projections 22 and are not connected by any lip.

Wedges 3 stamped in the bottom of the tire carrying rim 4 are adapted to co-operate with the projections 2 for detachably carrying the rim on the felloe. The rim is formed of sheet metal and may be of any cross section suitable for clincher, straight wall or other tire casing.

To prevent lateral movement of the rim 4 relative to the felloe 1 we provide the former with locking ribs 5 adapted to engage the adjacent sides of the projections 2. These ribs are formed by pressing or stamping out the central portions of the wedges 3 to direct the ribs inwardly towards the axis of the rim. The ribs do not extend below the apices of the wedges, which arrangement decreases the necessary amount of clearance space between the rim and the felloe when they are assembled.

From the above description it is evident that the rim may be placed on the felloe by passing the valve stem through one of the slots 6 and moving the rim parallel to the axis of the wheel with its wedges 3 circumferentially positioned between adjacent pairs of projections 2, until the rim is properly positioned relative to the felloe. The rim is then rotated relative to the felloe to bring the wedges 3 and ribs 5 into engagement with the inclined faces $2^a$ or $2^b$ and the adjacent sides of the projections 2 respectively.

To releasably lock or retain the rim 4 in position on the felloe 1 we provide a tapered key 8 adapted to engage one of the abutments 9, stamped from or secured to the rim, and one of the pairs of shoulders 10, $10^a$ formed on the felloe. The rim when it is being mounted on the felloe, as hereinbefore described, is first rotated by hand until the wedges 3 engage the projections 2. The key 8 is then inserted between the shoulders 10 and the adjacent abutment 9 and is driven into its locking position between them which further rotates the rim relative to the felloe to cause the wedges and the locking ribs 5 to tightly engage the projections. The key is provided with a head having an opening adapted to receive a bolt 11 suitably carried by the felloe 1. The nut of the bolt is adapted to engage the head of the key to hold the latter in its locking position.

It will be noted that the lip 12 at each side of the felloe is cut away adjacent the shoulders 10, 10ª so that the head of the wedge key may be drawn up close to the side of the felloe.

To release the rim from the felloe the wedge is removed and is driven between the shoulders 10ª and the adjacent abutment 9. The shoulders 10 and 10ª are integrally formed on the peripheries of the opposite walls of the felloe and are given additional bearing surface by the lips 13 integral with the felloe and preferably with one another at the same side.

The key is tapered on each side to enable it to be used on left and right hand wheels, with the head always directed away from the vehicle so that it may be readily operated.

Owing to the felloe being formed with projections having oppositely inclined faces, the rim 4 may be used on a felloe at either the right or left hand side of a vehicle, one set of faces being used in one case and the other in the other case, since it is important that the road resistance tends to force the projections and wedges into engagement rather than the reverse. It will also be noted that the abutments 9 have their faces convexed in such a manner as to facilitate the engagement therewith of the wedge 8 from either side of the wheel (see Fig. 9).

What we claim is:—

1. The combination of a channel shaped metal wheel felloe having its side walls provided with a plurality of stamped out spaced projections; and a metal tire rim also provided with a plurality of projections adapted to co-operate with the projections of the felloe when the rim and folloe are relatively rotated, the said projections being shaped to have a wedging engagement with one another.

2. The combination of a channel shaped metal wheel felloe having its side walls provided with a plurality of stamped out spaced projections; and a metal tire rim also provided with a plurality of stamped out projections adapted to co-operate with the projections of the felloe when the rim and felloe are relatively rotated, the said projections being shaped to have a wedging engagement with one another.

3. The combination of a channel shaped metal wheel felloe having its side walls provided with a plurality of stamped out spaced projections; and a metal tire rim also provided with a plurality of projections adapted to co-operate with the projections on the felloe when the rim and felloe are relatively rotated, the said projections being shaped to have a wedging engagement with one another, the metal forming the projections on the felloe being turned transversely thereof to increase the bearing surfaces of the projections.

4. The combination of a channel shaped metal wheel felloe having its side walls provided with a plurality of stamped out spaced projections; and a metal tire rim also provided with a plurality of projections adapted to co-operate with the projections on the felloe when the rim and felloe are relatively rotated, the said projections being shaped to have a wedging engagement with one another, the wedge shaped projections on the felloe being formed with extensions turned outwardly in a direction parallel to the axis of the felloe to increase the bearing surfaces of the projections.

5. The combination of a channel shaped metal wheel felloe having its side walls provided with a plurality of stamped out spaced projections; and a metal tire rim also provided with a plurality of projections adapted to co-operate with the projections of the felloe when the rim and felloe are relatively rotated, the said projections being shaped to have a wedging engagement with one another, the metal of each wall of the felloe being turned outwardly to form a lip extending along the edge of the wall and of the projections.

6. The combination of a channel shaped metal wheel felloe having its side walls provided with a plurality of stamped out spaced projections; a metal tire rim also provided with a plurality of stamped out projections adapted to co-operate with the projections on the felloe when the rim and felloe are relatively rotated, the said projections being shaped to have a wedging engagement with one another; and locking ribs stamped out of the projections on the rim adapted to engage between pairs of projections on the felloe.

7. The combination of a channel shaped wheel felloe; a tire rim; a plurality of wedging projections formed on the rim and felloe and co-operating by relative rotary movement of the rim and felloe; abutments on the rim; two pairs of shoulders stamped out of the side walls of the felloe, one pair of shoulders facing each of the abutments; a wedge key tapered on each side adapted to engage either abutment and the adjacent pair of shoulders; a head on the wedge key; and an outwardly extending lip along the edge of each side wall of the felloe, including the shoulders, but cut away adjacent the shoulders to receive the head of the wedge key.

8. The combination of a channel shaped wheel felloe; a channel shaped tire rim; a plurality of wedging projections stamped out of the rim and felloe and co-operating by relative rotary movement of the rim and felloe; abutments having transversely and convexly curved faces on one of the relatively rotatable parts aforesaid; two pairs of shoulders stamped out of the side walls of the other of said parts, one pair of the said shoulders facing each of the said faces; and a wedge key adapted to engage either face and the adjacent pair of shoulders.

9. The combination of a channel shaped metal wheel felloe having the edges of its side walls provided with a plurality of stamped out spaced projections; a metal tire rim also provided with a plurality of stamped out projections adapted to co-operate with the projections on the felloe when the rim and felloe are relatively rotated, the said projections being shaped to have a wedging engagement with one another; locking ribs stamped out of the projections on the rim adapted to engage between pairs of projections on the felloe; abutments on the rim; shoulders stamped on each side of the felloe facing each of the abutments; and a wedge key adapted to engage either abutment and the adjacent shoulder.

10. The combination of a channel shaped metal wheel felloe having its side walls provided with a plurality of stamped out spaced projections; a metal tire rim also provided with a plurality of projections adapted to co-operate with the projections on the felloe when the rim and felloe are relatively rotated, the said projections being shaped to have a wedging engagement with one another, the wedge shaped projections on the felloe being formed with extensions turned outwardly in a direction parallel to the axis of the felloe to increase the bearing surfaces of the projections; and locking ribs stamped out of the projections on the rim adapted to engage between pairs of projections on the felloe.

WILSON K. FENTON.
DAVID A. McCOWAN.